(12) United States Patent
Shinotsuka

(10) Patent No.: US 6,993,784 B1
(45) Date of Patent: Jan. 31, 2006

(54) INFORMATION SIGNAL TRANSMISSION DEVICE

(75) Inventor: Hideaki Shinotsuka, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/040,560

(22) Filed: Mar. 18, 1998

(30) Foreign Application Priority Data

Mar. 24, 1997 (JP) .................................. P9-070240

(51) Int. Cl.
- H04N 7/18 (2006.01)
- G06F 3/00 (2006.01)
- G06F 9/00 (2006.01)
- G06F 17/00 (2006.01)
- G06F 15/173 (2006.01)

(52) U.S. Cl. .................. 725/74; 709/224; 715/839
(58) Field of Classification Search .................. 725/80, 725/82, 85, 74, 78, 143, 147, 151, 153, 117, 725/133; 709/218, 220–224; 340/825.24; 345/839; 710/15, 104; 370/455–457, 402, 370/465; 715/733, 839, 977; 713/173
See application file for complete search history.

(56) References Cited

U.S. PATENT DOCUMENTS

| 5,265,241 A | * | 11/1993 | Arnold et al. ................. 710/15 |
| 5,420,573 A | * | 5/1995 | Tanaka et al. ......... 340/825.24 |
| 5,574,965 A |   | 11/1996 | Welmer |
| 5,754,548 A | * | 5/1998 | Hoekstra et al. ............ 370/402 |
| 5,793,366 A | * | 8/1998 | Mano et al. ................. 715/839 |
| 5,838,248 A | * | 11/1998 | Nagano ...................... 340/2.7 |
| 5,959,536 A | * | 9/1999 | Chambers et al. .......... 710/104 |

* cited by examiner

Primary Examiner—Hai Tran
(74) Attorney, Agent, or Firm—Bell, Boyd & Lloyd LLC

(57) ABSTRACT

An information signal transmission device including objects, an event manager, a broadcast manager, and a network messenger. By simply exchanging a message with the event manager, the object can perform message exchange without any discrimination between communication outside the device and communication inside the device or without any discrimination between particular destinations and unspecified destinations. Cooperation between objects within the device and cooperation between devices are thus assured, permitting a time sufficient enough to transmit information signal.

4 Claims, 15 Drawing Sheets (A)  (B)

| MESSAGE TYPE | PARAMETER LENGTH | PARAMETER | |
|---|---|---|---|
| 32 bits | 16 bits | 32 bits | 32 bits |
| OBSERVE TYPE | 8 | EVENT NO. | OBSERVER |

(B)

| MESSAGE TYPE | PARAMETER LENGTH | PARAMETER | |
|---|---|---|---|
| 32 bits | 16 bits | 32 bits | 32 bits |
| CANCEL TYPE | 8 | EVENT NO. | OBSERVER |

(C)

| MESSAGE TYPE | PARAMETER LENGTH | PARAMETER | | |
|---|---|---|---|---|
| 32 bits | 16 bits | 32 bits | 16 bits | VARIABLE LENGTH |
| REPORT TYPE | VARIABLE LENGTH | EVENT NO. | PARAMETER LENGTH | PARAMETER |

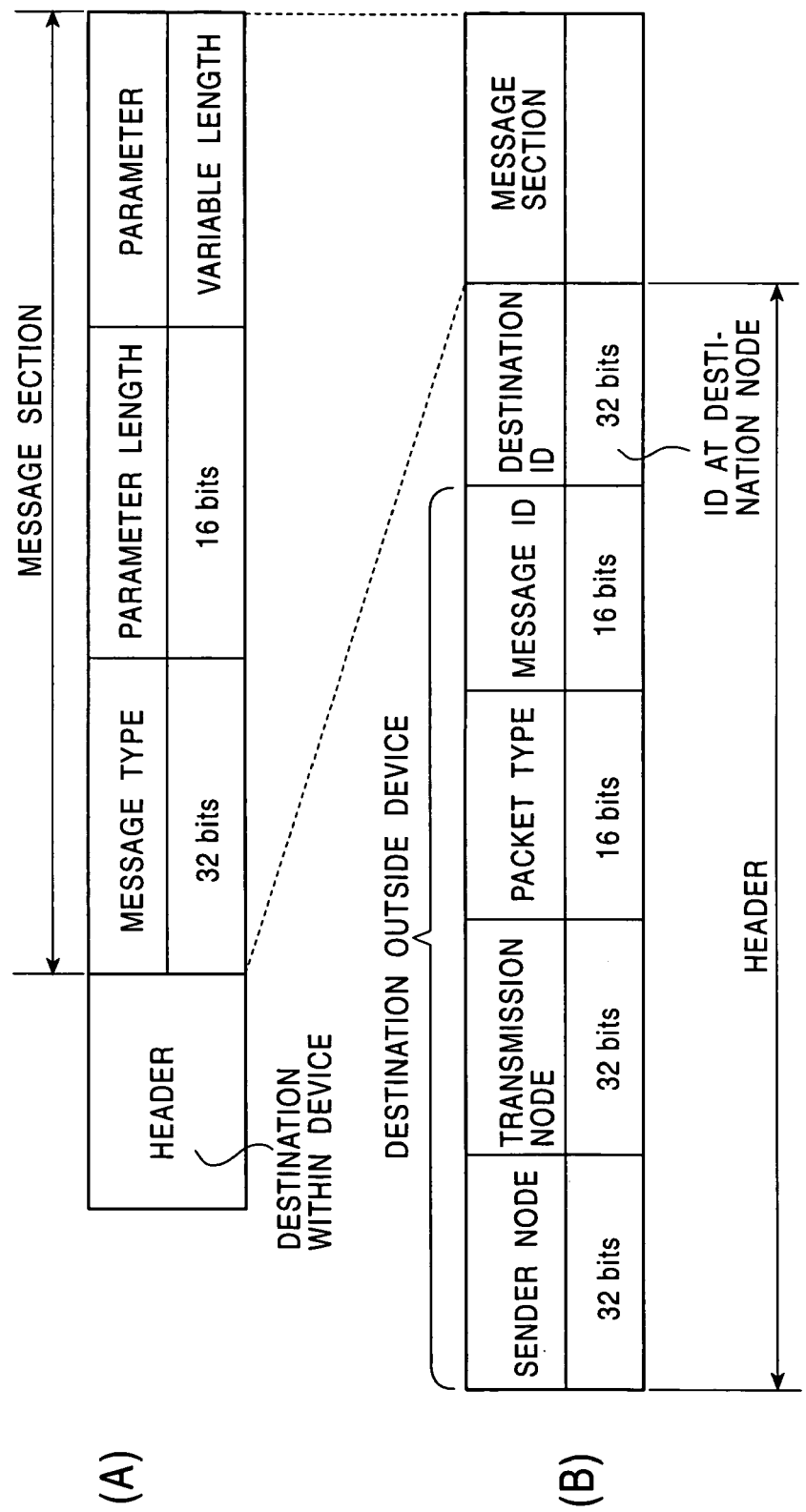

FIG. 7

| SENDER NODE | BROADCAST ID | CLIENT ID | BODY |
|---|---|---|---|
| DEPENDENT ON NETWORK | 32 bits | 32 bits | VARIABLE LENGTH |

FIG. 8

| | ID CONTAINED IN HEADER IN NETWORK | ID IN DESTINATION WHEN BROADCAST MESSAGE IS RECEIVED FROM OUTSIDE |
|---|---|---|
| MESSAGE TYPE | CLIENT ID | LOCAL ID OF DESTINATION |
| PULSE TRANS-MISSION TYPE | PULSE PACKET | BROADCAST MANAGER |
| REPORT TYPE | EVENT | EVENT MANAGER |
| SEARCH TYPE | SERVICE SEARCH | SERVICE REGISTRY |

TYPE OF MESSAGE RECEIVED BY BROADCAST MANAGER WITHIN APPARATUS

FIG. 9

| BROADCAST TIME | BROADCAST ID | CLIENT ID | BODY |
|---|---|---|---|
| DEPENDENT ON NODE | 32 bits | 32 bits | VARIABLE LENGTH |

FIG. 10

| SENDER NODE | BROADCAST ID | CLIENT ID |
|---|---|---|
| DEPENDENT ON NETWORK | 32 bits | 32 bits |

FIG. 11

| TAM TYPE | SENDER NODE | BROADCAST ID | RECEPTION TIME |
|---|---|---|---|
| 16 bits | 64 bits | 32 bits | DEPENDENT ON NODE |

| EVENT TYPE | PARAMETER LENGTH | PARAMETER |
|---|---|---|
| 32 bits | 16 bits | VARAIBLE LENGTH |

(B)

| MESSAGE TYPE | PARAMETER LENGTH | PARAMETER |
|---|---|---|
| 32 bits | 16 bits | |
| REPORT TYPE | VARAIBLE LENGTH | |

| EVENT TYPE | PARAMETER LENGTH | PARAMETER |
|---|---|---|
| 32 bits | 16 bits | VARAIBLE LENGTH |

(B)

| MESSAGE TYPE | PARAMETER LENGTH | PARAMETER |
|---|---|---|
| 32 bits | 16 bits | |
| BROADCAST TYPE | VARAIBLE LENGTH | |

INFORMATION SIGNAL TRANSMISSION DEVICE

BACKGROUND OF THE INVENTION

1. Field of the Invention

The present invention relates to an information signal transmission device such as video devices constituting an audio video system. More particularly, the present invention relates to the information signal transmission device that transmits and receives a message with no particular discrimination between outside and inside the device and with no particular discrimination between specified destinations and unspecified destinations, if viewed from an object within the device, by organizing information broadcasting means for broadcasting a message to a network and an event manager responsible for delivery of the message in a device, so that the network is released for the transmission of information signal as long as possible.

2. Description of the Related Art

In a conventional audio video (AV) system for transmitting information signal such as a video signal and audio signal, a video signal and an audio signal output by a tuner or a video cassette recorder are input to a television receiver through a dedicated analog line, and the television receiver is controlled through a remote control so that a desired video signal or a desired audio signal may be enjoyed.

If such an AV system is connected through a network to transfer video data and audio data, the interconnection of the video signal and audio signal is expected be simplified. A diversity of devices may be easily connected to the system as necessary. Through the network, various devices may be integrally managed to improve the ease of use of the AV system.

When the devices are integrally managed, the core device for controlling the entire operation of the system must monitor terminal devices. When an optical disk is changed on an optical disk player as a terminal device, for example, the core device of the system is required to detect the title of the optical disk newly loaded.

Among devices for receiving a television broadcast program, some receive satellite broadcast signals, some receive cable television signals, and the others receive ground waves, and in the system including such devices, the core device has to monitor receivable channels for all devices. There are times when new devices are added to the AV system increasing the receivable channels in the AV system.

To respond to the change in the state of each network terminal, the core device in the system regularly interrogates each device to detect a change with a sufficient time allowed. Such an interrogation shortens the time during which the network is released for the transfer of the video data and audio data, thereby leading to a failure to transmit the video data and audio data on a real-time basis.

The core device may place the same request with a group of devices as necessary, for example, may request all tuners connected to the network to report their channel lists. In such a case, the sender of such a request message has a difficulty detecting which ones of a plurality of devices are able to respond to the message. When a diversity of devices are simply connected to the network, this type of interrogation is thought of as a broadcasting with no particular destination specified. In succession to the broadcasting, there will be times when the connection configuration itself is changed.

In the one-to-one communication in which a destination of a message is specified, an acknowledgement is made, and a retransmission is requested in the event of a timeout to perform this type of interrogation. With this arrangement, however, the change of the lineup of the connected devices requires the sender to receive an acknowledgement from each of the destinations of a variable number for successful reception, making complex a communication procedure involved. When the connection happens to change between the acknowledgement from the destination and the communication of the message, a retransmission request is repeatedly made to a device that may have difficulty in responding to the interrogation. If a timeout is set in this case, a system error may be triggered. To assure the reliability of the system, the acknowledgement is essential and cannot be omitted.

SUMMARY OF THE INVENTION

Accordingly, it is an object of the present invention to provide an information signal transmission device that releases a network to allow a sufficient time for the transfer of an information signal.

To achieve the above object, the present invention comprises information broadcasting means for broadcasting a message to the network and an event manager responsible for delivering the message within the device.

With the information broadcasting means for broadcasting the message to the devices connected to the network and the event manager responsible for delivering the message within the device, the object in the device can exchange a message with an unspecified destination without any discrimination between outside and inside the device by simply exchanging a message with the event manager in a one-to-one communication. With this arrangement, the workload on the object is lessened, a coordinated operation between objects and between devices is assured, and a sufficient time is thus allowed for the transfer of the information signal.

BRIEF DESCRIPTION OF THE DRAWINGS

FIGS. 5A through 5C show a message which is related to the registration of the service list;

FIGS. 6A and 6B are diagrams explaining a packet transmitted from a network messenger to a transmission module;

FIG. 7 is a diagram explaining a packet transmitted from a broadcast messenger to a transmission module;

FIG. 8 shows a table that records a client ID held by the broadcast manager;

FIG. 9 is a diagram explaining a backlog held by the broadcast manager;

FIG. 10 shows a pulse packet;

FIG. 11 is a diagram explaining a reception record held by the broadcast manager;

FIGS. 15A and 15B show the message that is reported to the broadcast manager through the processing shown in FIG. 14;

FIGS. 16A and 16B show the message that is reported to the event manager when the message is broadcast to the network;

DESCRIPTION OF THE PREFERRED EMBODIMENT

Figure 1:
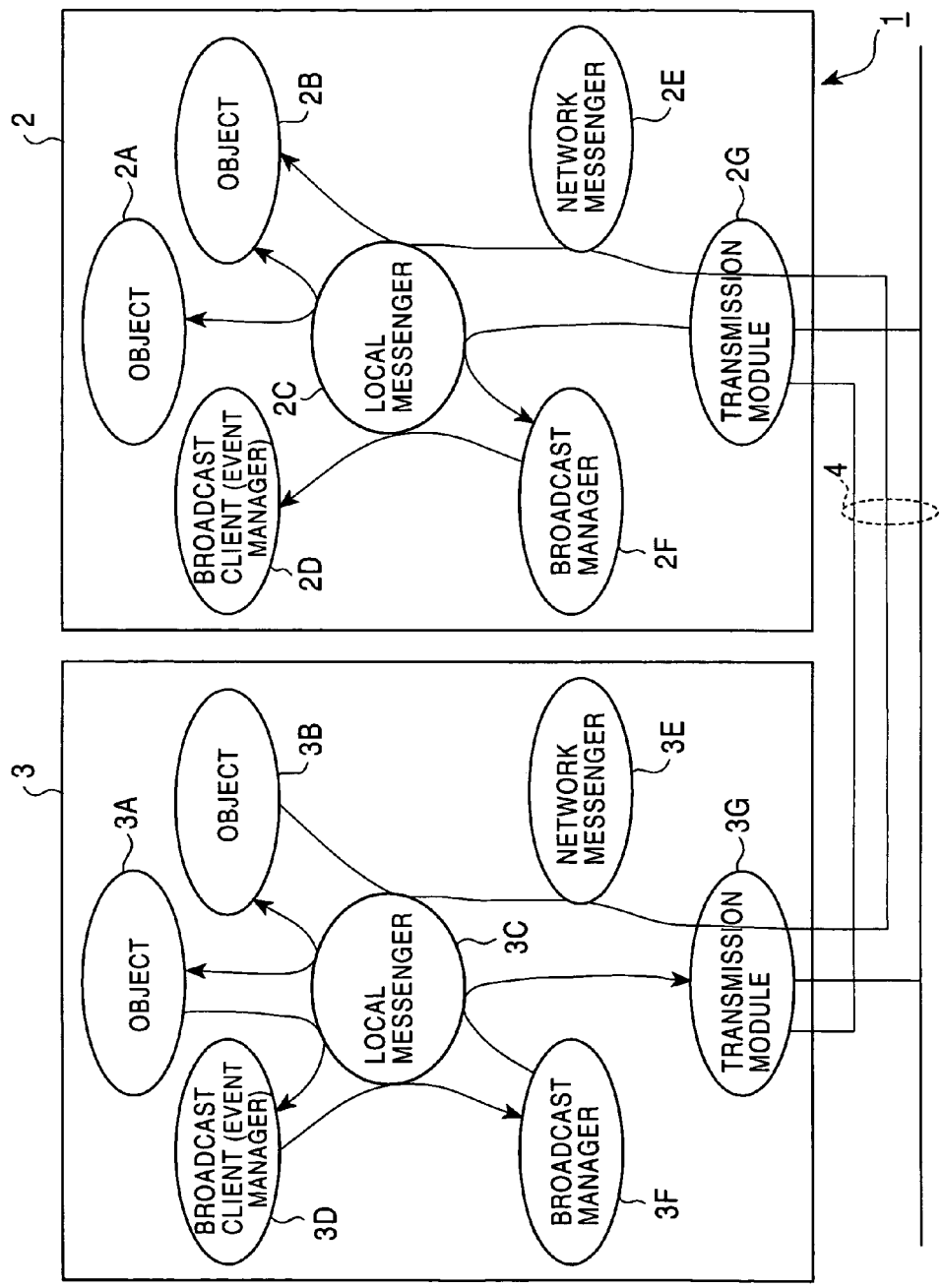
FIG. 1 is a block diagram showing an audio video (AV) system of one embodiment of the present invention.

Referring to the drawings, the embodiment of the present invention is now discussed.

FIG. 1 is a functional block diagram of communication system of an audio video (AV) system according to one embodiment of the present invention. The AV system 1 is organized by connecting a television receiver 2 and a video cassette recorder 3 through a network 4, and the television receiver 2 is set as a core device for the system for controlling the general operation of the system.

Although the television receiver 2 and video cassette recorder 3 have different objects to be controlled and different control procedures associated with the different objects, they share the common communication system. In the following discussion, identical components are designated with the same alphanumeric letters and the explanation about them is not duplicated.

The video cassette recorder 3 receives on a desired channel in its unshown tuner and outputs a video signal and an audio signal. The video cassette recorder 3 further records, in its magnetic recording and reproducing unit, the video signal and audio signal received in its tuner or received through the television receiver 2, and reproduces the recorded video and audio signals. The video cassette recorder 3 includes objects 3A and 3B, each constructed of a control module for controlling the tuner and the magnetic recording and reproducing unit, and each assigned a unique identification (ID) number.

The television receiver 2 receives on a desired channel and outputs the video signal and audio signal. The television receiver 2 further displays on its monitor the video signal output by the tuner, or displays the video signal reproduced by the video cassette recorder 3. The television receiver 2 includes objects 2A and 2B, each constructed of a control module for controlling the tuner and the monitor, and each assigned a unique ID number.

When an event which needs to be reported to many and unspecified destinations takes place, the objects 2A through 3B report the event to other modules within the respective device via the event manager 2D, 3D as a broadcast client, or report the event to external devices via the event manager 2D, 3D as a broadcast client, broadcast manager 2F, 3F and the network 4. The term event means a change in the state of a module to be controlled by the objects 2A through 3B; for example, the events in the video cassette recorder 3 includes a channel switching action by a user, and the end of the loading, unloading and reproduction operations of a magnetic tape. The connection of the devices 2 and 3 to the network 4 is also interpreted as the occurrence of an event. When the television receiver 2 and video cassette recorder 3 are connected to the network 4, another unshown object to be controlled detects physically their connection, and then reports the event information about the connection.

The objects 2A through 3B report the occurrence of the event to the modules within the devices by exchanging a message with the modules within the devices through the event managers. When the event managers report the event, they request the broadcast manager 2F, 3F to broadcast the massage.

The objects 2A through 3B receive messages addressed to themselves by the other objects within the devices and messages addressed to themselves by other devices via the network 4, and control the operation of objects in response to the change of state in the other objects and further in the other devices.

In the exchange of messages, the objects 2A through 3B report a message to the broadcast client 2D, 3D via local messenger 2C, 3C. The broadcast client 2D, 3D thus delivers the message to registered destinations within the device and unspecified destinations outside the device. Conversely, the device receives the message delivered by the broadcast client 2D, 3D, through the local messenger 2C, 3C; in this way the message transmitted from within the device or from the external devices connected to the network 4 is acquired. The delivery of the message to the destination registered in the device is handled through the function of the event manager in the broadcast client 2D, 3D and the delivery of the message to the unspecified destinations outside the device is handled by the event manager, as the broadcast client 2D, 3D, which uses the broadcast manager. The broadcast message received through the network is delivered to a registered destination by the event manager in one-to-one communication.

The objects 2A through 3B report a variety of messages to within and outside the device in a one-to-one communication with the broadcast client 2D, 3D. Regardless of destinations outside or within the device, an ordinary communication with a single destination is processed by the local messenger. With a destination being a particular device outside the device, the local messenger performs communication using a network messenger.

Figure 2:
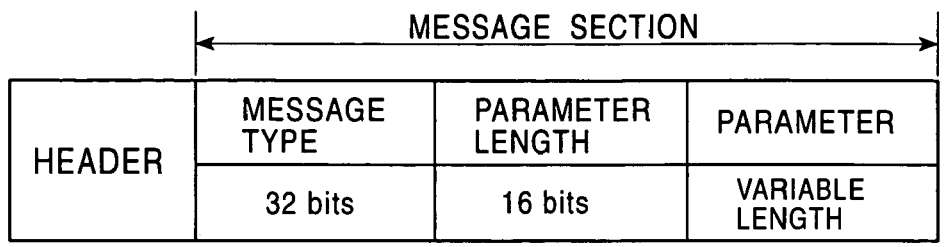
FIG. 2 shows a message transmitted by each object.

Referring to FIG. 2, the message transmitted from the objects 2A–3B to the broadcast client 2D, 3D is constructed of a header identifying a destination and an originator and a message section containing the content of the message. The message section is constructed of data of a message type identifying the message, data indicative of a parameter length, and data indicative of a parameter accompanying the message (FIG. 2).

When the objects 2A–3B report the event, the event manager in the destination assigns an event report to the message type to request the local messenger to deliver the message by an event number and an event parameter.

The local messenger 2C, 3C manages the transmission and reception of a message which has a destination that is identified as one of the modules within the device. More particularly, each of the local messenger 2C, 3C reports the message to the destination corresponding to the destination ID set in the header referring to the ID set in each module. When the corresponding module is currently working, the local messenger 2C, 3C holds the message so that the request to the module may not be lost.

The local messenger 2C, 3C provides each message to the corresponding module by storing once each message in a memory to manage the organization of the addresses corresponding to the destinations in the memory, or by forming a link between addresses according to a series of message destinations to manage the list of links. When a destination ID is not the one within the device, the local messenger 2C, 3C requests the network messenger 2E, 3E to process it.

In the transmission of the message between modules, the local messenger 2C, 3C delivers the message that is transmitted from the originator in the AV system 1 in one-to-one communication to the destination in the AV system 1.

The broadcast client 2D, 3D includes an event manager and a service registry. The event manager delivers an event message input via each of the local messenger 2C, 3C to the module within the device, while using the broadcast manager. The service list is a list of objects (objects of communication within and outside the device, viewed from the event manager, and including the network messenger 2E, 3E), and is updated by a predetermined message reported via the local messenger 2C, 3C. The service registry is a list of the modules within the device, and is used by the broadcast manager during service search.

Figure 3:
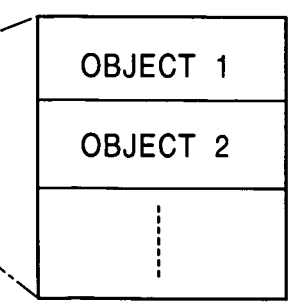
FIGS. 3(A) and 3(B) show a service list of a broadcast client of FIG. 1.

FIGS. 3(A) and 3(B) show the service list, which lists event numbers indicating the type of each service and corresponding destination list (FIGS. 3(A) and 3(B)).

The event manager delivers the message (event information) that is acquired from the local messenger 2C, 3C according to the service list. More specifically, the event manager produces two messages for objects 1 and 2 when the destination list designates objects 1 and 2 as destinations for an event 1, and sends the two messages to the local messenger 2C, 3C. As for an event 2, message process ends without sending it to any modules. Determining that the object requests broadcasting, the event manager then sends the message according to the service list, requesting the broadcast manager 2F, 3F to broadcast the message.

The television receiver 2 and video cassette recorder 3 are thus designed to deliver a variety of event information obtained to corresponding modules in one-to-one communication or one-to-many communication. In this way the event manager sends the same message to a plurality of destinations.

The event manager identifies a destination according to the service list and sends the message to the local messenger 2C, 3C. The local messenger 2C, 3C determines whether the destination is within or outside the device. When the destination is outside the device, the local messenger 2C, 3C sends the message to the network messenger. When the message is intended to be broadcast over the network 4 for many and unspecified destinations, the local messenger 2C, 3C sends the message to the broadcast manager 2F, 3F.

When the event manager sends the message to the broadcast manager 2F, 3F, it also sends the content of the message (shown in FIG. 4A) reported by the local messenger 2C, 3C. With this arrangement, the event manager receives the report of the message from the broadcast manager 2F, 3F in the same format as the message report from the objects 2A–13B as shown in FIG. 4A.

To deliver the message, the event manager recognizes the message type of the message received. Furthermore, when the event manager determines, according to the message type, that the received message is an observe message, the event manager updates the service list based on the content of the message. The video cassette recorder 3, for example, updates the service list when a new device is connected to the network 4 so that the video cassette recorder 3 reports a variety of events to the newly connected device.

FIG. 5 shows the message that is used to report the observe message. The message section only is shown in FIG. 5. The observe message is produced, as necessary, by an object within or outside the device. When the connection of a device to the network 4 is physically detected, for example, the observe message is reported to the event manager from the newly connected device or the device already connected to the network via the network messenger 2E, 3E or the broadcast manager 2F, 3F.

A series of messages are formed with parameters expanded, compared with the messages exchanged between modules through the local messenger 2C, 3C (see FIGS. 2A and 4A). More particularly, the message requesting the registration of an observer to the service list (FIG. 5A) is assigned 32-bit data in the message type indicative of the observe type, and the event number to be reported and the observer indicative of the destination are set in the parameter. The message (FIG. 5B) requesting the cancellation of the registration is assigned data indicative of cancellation in the message type, and the event number requesting cancellation and the observer indicative of the destination to be canceled are set in the parameter.

When a module requests a registration or cancellation with the service list updated, the event manager sends to the module a response message representing a request acknowledgement in the same format as the request. The event manager also sends a response message representing an acknowledgement in response to a message reported through the broadcast manager 2F, 3F and in response to an event report within the device. When the event manager receives an event report, the event manager reports the occurrence of the event according to the service list. An indication that this report is a report of the occurrence of the event is set in the message type. In succession, the data of length of a variable-length parameter and the data of the parameter are set (FIG. 5C). The data of the parameter includes an event number, data of parameter length and data of the parameter.

The network messenger 2E, 3E searches the list of external devices held, referring to the destination designated by the local messenger, and sends a message to the network 4 via transmission module 2G, 3G in accordance with the external device ID. In this course of process, the network messenger 2E, 3E converts the message acquired through the local messenger 2C, 3C into the one in a predetermined format compatible to the network 4, and sends this converted message to the transmission module 2G, 3G.

The predetermined format is a packet format that is common to and processed by all devices connected to the network 4, and is as shown in FIGS. 6A and 6B, for example. The network messenger 2E, 3E sets the message acquired through the local messenger 2C, 3C in the message section, and adds a header to the message section to organize a packet (see FIGS. 6A and 6B).

The header is described by 32-bit data if a destination node, namely, a destination is an IP address, and a sender node representing own device is described by 32-bit data. In succession, a packet type representing the type of the packet is described by 16-bit data. The packet type discriminates a transmission packet sent to a particular destination, a response packet that is transmitted to a particular destination which issues a request in response to a request from an external device, and a broadcast packet that is broadcast to each device connected to the network. In case of the broadcasting, the broadcast packet to be fed to the transmission module 2G, 3G is created by the broadcast manager 2F, 3F rather than by the network messenger 2E, 3E.

The header is tagged with a message ID that discriminates between a transmission packet and a response packet. Furthermore, the header has an ID for identification in the destination node which is described by 32-bit data. The destination ID helps a destination device identify which object of the device the response is issued to.

The network messenger 2E, 3E receives the packet input to the transmission module 2G, 3G, selects the packet that is addressed to own device as a destination node, and sends the message of the packet to the local messenger 2C, 3C. The network messenger 2E, 3E outputs the message of the object within the device to the external device via the local messenger 2C, 3C and conversely reports the message coming in from the external device to the object within the device via the local messenger 2C, 3C.

In the television receiver 2 and video cassette recorder 3, the local messenger 2C, 3C is responsible for the one-to-one communication within the device, while the network messenger 2E, 3E is responsible for the one-to-one communication of the local messenger 2C, 3C between the devices.

The network messenger 2E, 3E updates the stored list of the external devices according to the received message as the broadcast client 2D, 3D does. With this arrangement, the video cassette recorder 3 is enabled to exchange a variety of messages with a newly connected device in the one-to-one communication.

The broadcast manager 2F, 3F receives the message from the broadcast client 2D, 3D, and broadcasts the message to the network 4 via the transmission module 2G, 3G. The broadcast manager 2F, 3F further sends, to the transmission module 2G, 3G, a series of messages related to the broadcasting.

Conversely, the broadcast manager 2F, 3F receives, via the transmission modules, the message that is broadcast to the network by another device and further the message related to the broadcasting, and reports them to the broadcast client 2D, 3D.

FIG. 7 shows the message the broadcast manager 2F, 3F sends to the transmission module 2G, 3G. The broadcast manager 2F, 3F sets the message, already described with reference to FIG. 4, from the broadcast client 2D, 3D in a body, and adds data about a sender node, a broadcast ID and a client ID to the body.

The sender node identifies own device. The broadcast ID is assigned a serial number set by the broadcast manager 2F, 3F. The broadcast manager 2F, 3F sequentially increments the broadcast ID each time one message is transmitted to the network. The broadcast manager 2F, 3F at the destination node recognizes the change in the broadcast ID, thereby detecting a missing message or a reception failure.

If the destination detects a missing message, it may request a retransmission of the message. In the retransmission of the message, a retransmission request can be accepted in the one-to-one communication with the destination specified, and the message can be retransmitted in response to the retransmission request in the one-to-one communication. In this way a sufficient reliability will be assured even if a desired message is broadcast without an acknowledgement from a broadcast receiver (namely, without performing a timeout process).

The client ID indicates the module of the destination of the response message responsive to the message. Based on the needs of modules other than the event manager, the broadcast manager 2F, 3F may broadcast a message to the network 4. The client ID is added to identify the broadcast client requiring the report of the response message.

The broadcast manager 2F, 3F stores a table shown in FIG. 8 to process the message from the destination of broadcast referring to the client ID as a reference, and reports the message to an internal module corresponding to the client ID, according to the table. More particularly, in this table, an ID within the device designating the broadcast manager 2F, 3F is set to be the client ID added to a pulse packet to be described later. An ID within the device designating the event manager is registered in the message that reports the event. An ID within the device representing the service registry holding the list of service modules within the device is registered in the message related to the search of services.

When the broadcast manager 2F, 3F acquires the message via the transmission module 2G, 3G, the broadcast manager 2F, 3F acquires it according to the format specified in FIG. 7, and organizes the header according to the table shown in FIG. 8 to report it to the broadcast client 2D, 3D.

When the message is sent in this way, the broadcast manager 2F, 3F stores a backlog of transmission records for each network for a predetermined period of time, and retransmits the previously broadcast message in the one-to-one communication in accordance with the request from other devices. The broadcast manager 2F, 3F thus retransmits the message to the devices that have missed the message.

As shown in FIG. 9, the broadcast manager 2F, 3F records sequentially the time of broadcasting the message, the broadcast ID of the broadcast message, the client ID and the body, thereby forming a backlog. The broadcast manager 2F, 3F may receive no message of retransmission from other devices within a predetermined time elapse from the time of broadcasting, after the broadcast manager 2F, 3F records the backlog. In such a case, the broadcast manager 2F, 3F deletes the recorded items from the backlog. The predetermined time is a duration long enough for the receiver side to detect a reception failure, and will be set as described later.

The broadcast manager 2F, 3F periodically transmits the pulse packet having the organization shown in FIG. 10. The pulse packet is constructed of the destination node, the broadcast ID, and the client ID. This organization is the message broadcast to the network 4, but without the body. The pulse packet is broadcast at time intervals appropriate to a destination network, the broadcast ID is the one of the most recently broadcast message to the destination network, and the client ID is assigned the broadcast manager.

The broadcast manager 2F, 3F in each of the devices connected to the network 4 compares the broadcast ID assigned to the pulse packet to the broadcast ID of the message received immediately before it to detect a reception failure. When a reception failure is detected, the destination of the message is identified based on the client ID of the pulse packet so that the retransmission request is placed in the one-to-one communication.

The broadcast manager 2F, 3F holds the broadcast message in the backlog for a duration at least twice as long as but shorter than several ten times the transmission repetition period of the pulse packet, before deleting the message. Since there is a possibility that a receiver may fail to receiver a packet for the second time in succession to a first reception failure, the duration of time for holding the message is set in consideration of the reliability of the network 4. The broadcast manager 2F, 3F reliably retransmits the message in response to the retransmission request the receiver issues after detecting the reception failure.

The broadcast manager 2F, 3F holds a reception record about the most recently received message as shown in FIG. 11 to process the pulse packet transmitted by other devices. The broadcast manager 2F, 3F holds the reception record for each sender node, including TAM type representing the network of the sender node, a broadcast ID and reception time. The broadcast ID is the one attached to the most recently received message, and the reception time is the time at which the message is acquired.

The broadcast manager 2F, 3F detects a reception failure by comparing the broadcast ID attached to the received pulse packet to the broadcast ID recorded in the table. When a time elapse exceeds the reception time, the broadcast manager 2F, 3F determines that the sender node is removed from the network.

The transmission module 2G, 3G converts the message produced by the network messenger 2E, 3E into a packet complying with a communication protocol (TCP/IP, for example), and sends the packet to the network 4. Conversely, the transmission module 2G, 3G receives a packet other devices transmit to the network 4, converts the packet into the one in a format compatible with the network messenger 2E, 3E (the format of the message transmitted by the network messenger 2E, 3E), and outputs it to the network messenger 2E, 3E.

In the television receiver 2 and video cassette recorder 3, a variety of transmission module 2G, 3G may be added to each of the network messenger 2E, 3E. For example, besides the TCP/IP interface, the IEEE 1394 interface may be included to connect external devices. Through the one-to-one communication carried out by the network messenger 2E, 3E, a user may input a record channel and record time by operating the video cassette recorder 3, and then may visually check the record channel and the record time watching the display screen of the television receiver 2.

Upon sending the message in one packet, the transmission module 2G, 3G releases the network 4 for another job (a transfer of the video data and audio data, for example) without waiting for a response message. The transmission module 2G, 3G monitors the network 4. When a packet addressed to own device as a destination node is transmitted to the network, the transmission module 2G, 3G receives it, and reports the packet to the broadcast manager 2F, 3F or the network messenger 2E, 3E.

Figure 12:
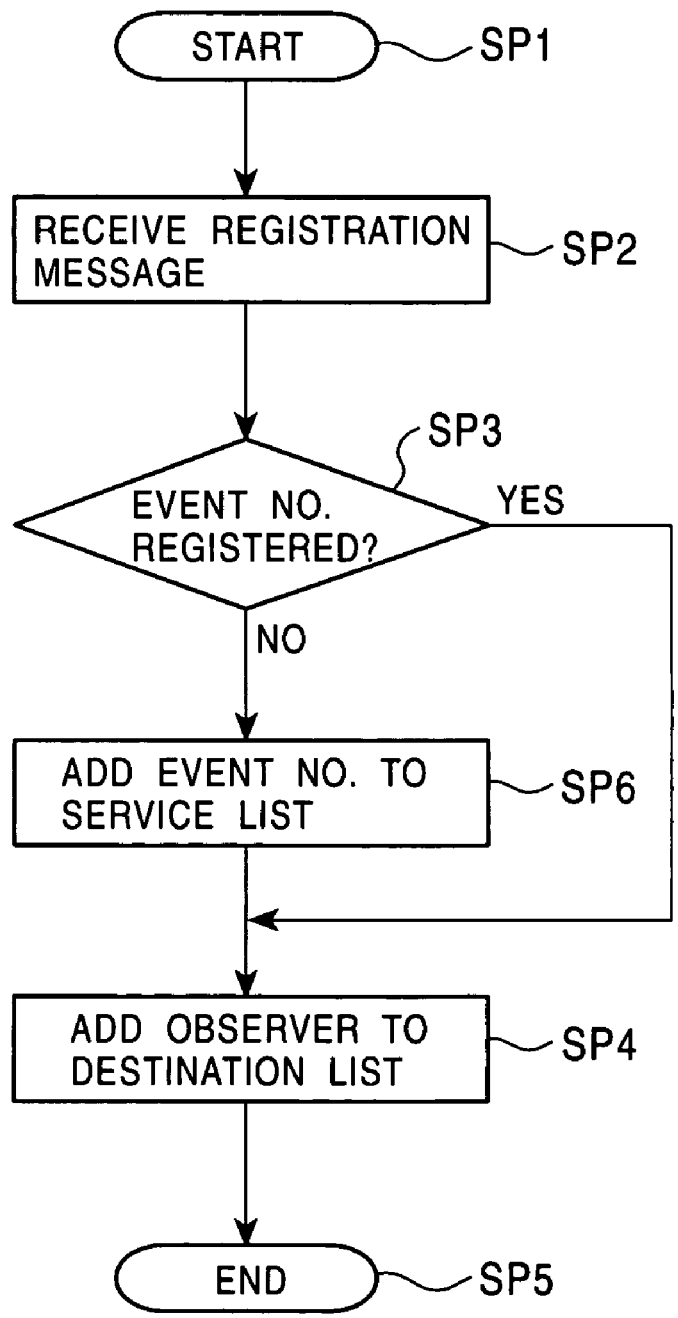
FIG. 12 is a flow diagram showing the processing of the message shown in FIG. 5A in the event manager.

FIG. 12 is a flow diagram showing the processing by the event manager. The event manager performs this processing when an observe message (FIG. 5A) requesting a registration to the message list (FIGS. 3(A) and 3(B)) comes in. When the message requesting the registration is reported, the event manager goes from step SP1 to SP2 to receive the message. The event manager goes to step SP3, where it determines whether the reported event number of the message is already registered in the service list.

When the event number is already registered, the event manager goes to step SP4 to register the observer added to the message in the destination list of this event number, and then goes to step SP5 to end the process.

When the corresponding event number is unregistered in the service list with an affirmative answer resulting from step SP3, the event manager goes to step SP6 to register the event number in the service list. The event manager then goes to step SP4 to register a destination. In this way, the event manager sets the destination of the message as required, and the event manager also exchanges a variety of messages between modules within the device in the one-to-one communication.

Figure 13:
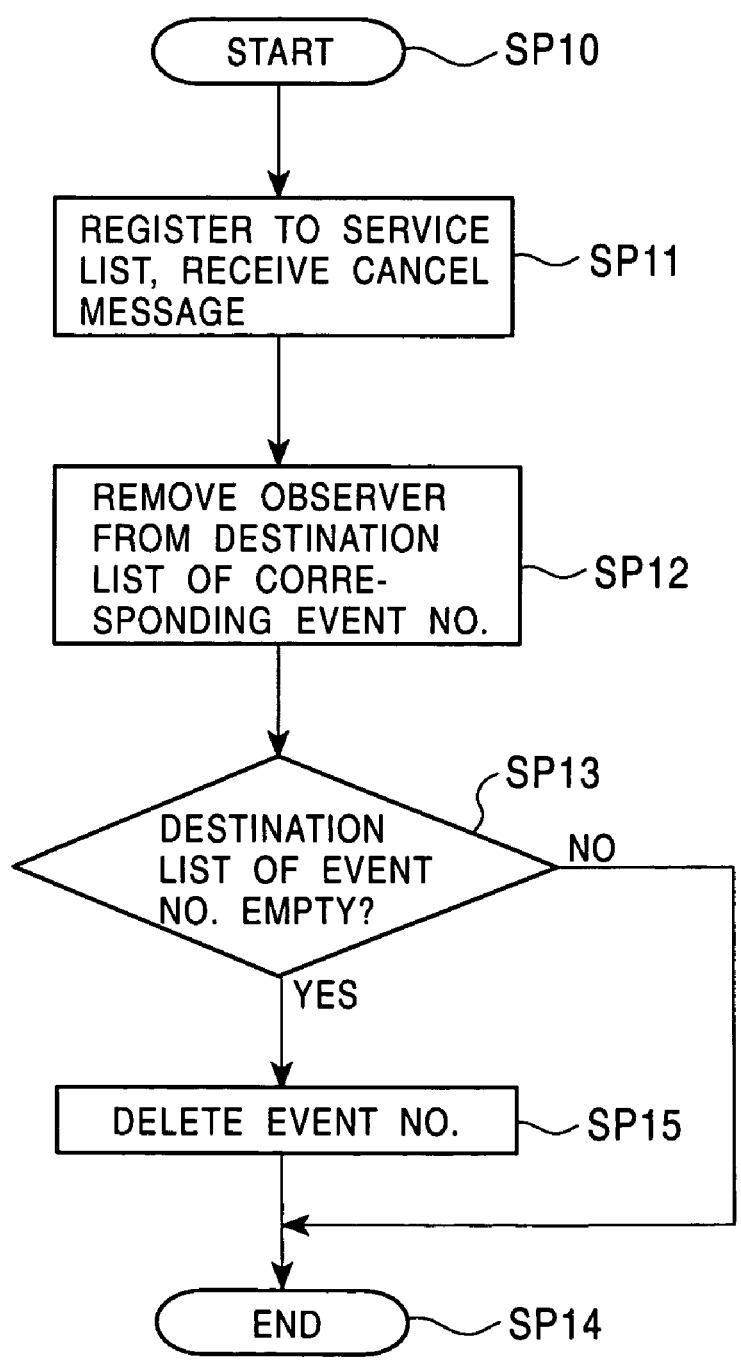
FIG. 13 is a flow diagram showing the processing of the message shown in FIG. 5B by the event manager.

FIG. 13 is a flow diagram showing the process by the event manager when a message to cancel the registration (FIG. 5B) in the service list is reported. The event manager goes to step SP11 from step SP10 to receive the message, and then goes to step SP12. The event manager searches the service list for the corresponding event number, and then removes the corresponding observer from the destination list of the event number.

In succession, the event manager goes to step SP13 to determine whether the destination list of the event number is empty. When any destination registered remains in the destination list, the event manager goes to step SP13 to end the process. When no destination remains in the destination list with an affirmative answer resulting from step SP13, the event manager goes to step SP15 where the event manager deletes the event number from the service list. The event manager goes to step SP14.

When a predetermined object is removed, the event manager deletes all destinations related to the message to cancel all registrations so that unnecessary process is reduced.

Figure 14:
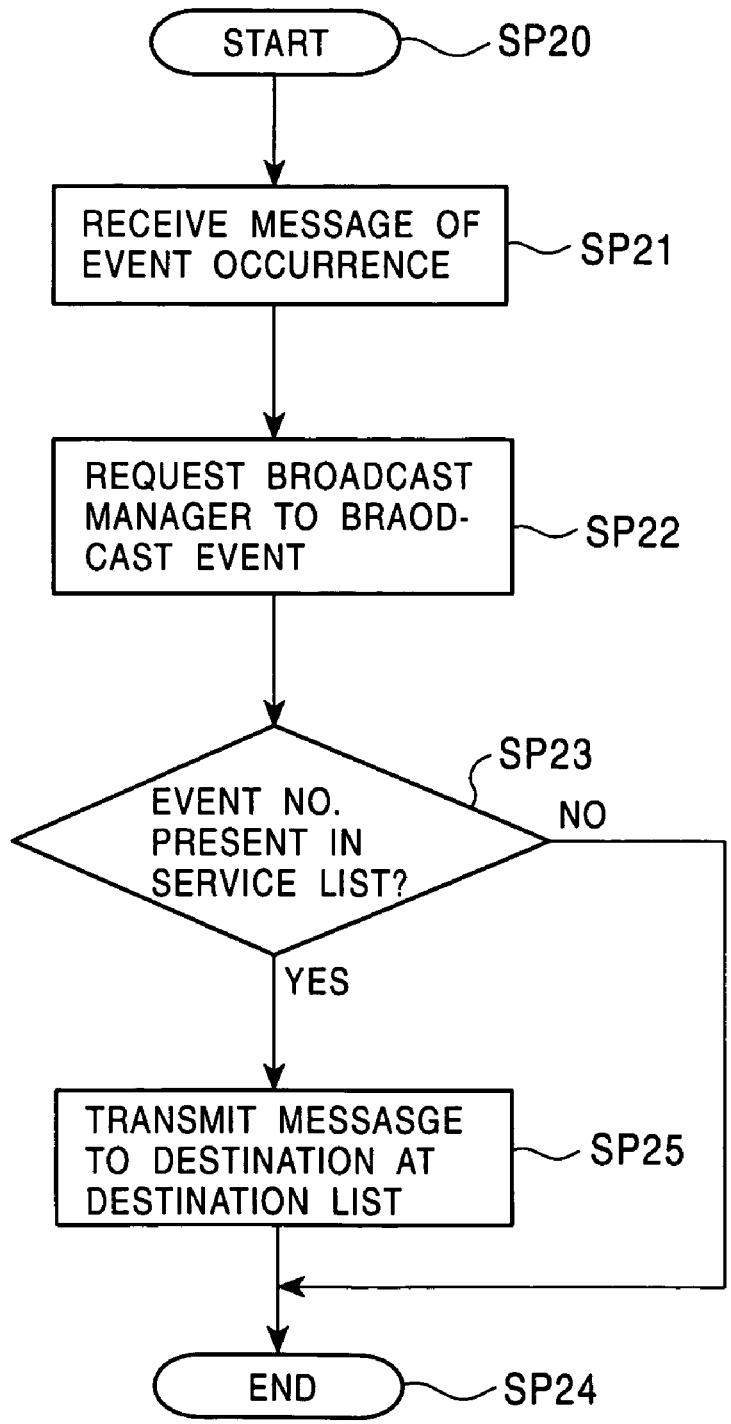
FIG. 14 is a flow diagram showing the processing by the event manager when the message that an event to be broadcast occurs is reported.

FIG. 14 is a flow diagram showing the process by the event manager when the message of an event occurrence to be broadcast is reported. The event manager goes to step SP21 from step SP20 to receive the message. The event manager goes to step SP22 to request the broadcast manager 2F, 3F to broadcast the event. The event manager then goes to step SP23 to determine whether the corresponding event number is registered.

When the corresponding event number is unregistered, the event manager goes to step SP24 and ends the process without reporting the occurrence of an event. When the event number is registered with an affirmative answer resulting from step SP23, the event manager goes to step SP25 to deliver the message to the corresponding destination. The event manager goes to step SP24. The event manager broadcasts the occurrence of the event to the network 4 while reporting the occurrence of the event to a pre-registered module within the device.

The message of the event occurrence thus delivered by the event manager is organized by assigning data indicative of the report type to the message type as shown in FIG. 15.

When the message broadcast to the network 4 is reported by the broadcast manager 2F, 3F, the event manager performs a predetermined process to deliver the message shown in FIG. 16 to the corresponding module. The message here is organized by assigning data of broadcast type indicative of broadcast to the message type.

Figure 17:
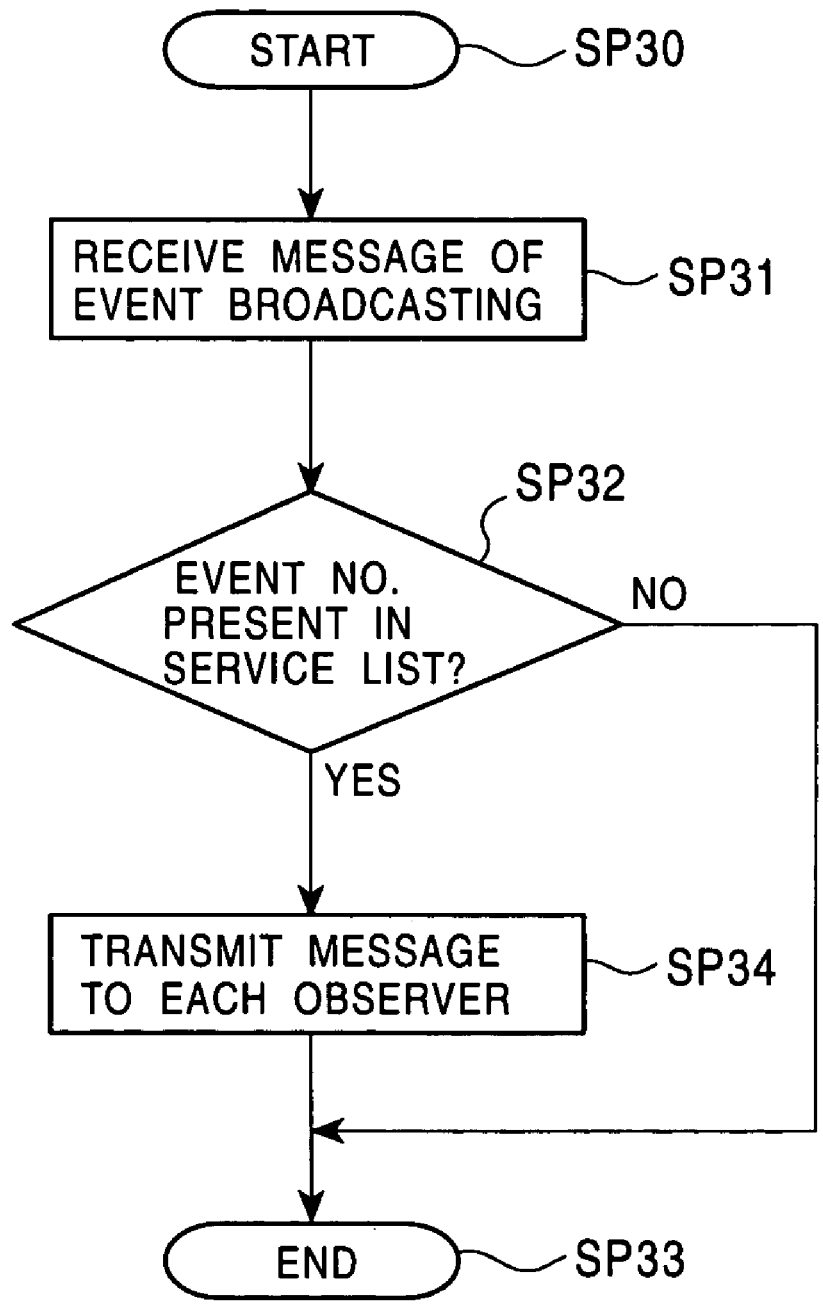
FIG. 17 is a flow diagram showing the processing of the message of FIGS. 16A and 16B in the event manager.

FIG. 17 is a flow diagram of the process by the event manager when the message broadcast to the network 4 is reported by the broadcast manager 2F, 3F. The event manager goes to step SP31 from step SP30 to receive the event, and then goes to step SP32. The event manager determines whether the corresponding event number is registered in the service list.

When the corresponding event number is unregistered, the event manager goes to step SP33, and ends the process without delivering the message to the module within the device. When the corresponding event number is registered with an affirmative answer resulting from step SP32, the event manager goes to step SP34 to deliver the message to the destination registered for the event number. The event manager goes to step SP33. In this way the event manager delivers the message broadcast to the network 4 to the corresponding module within the device.

Figure 4:
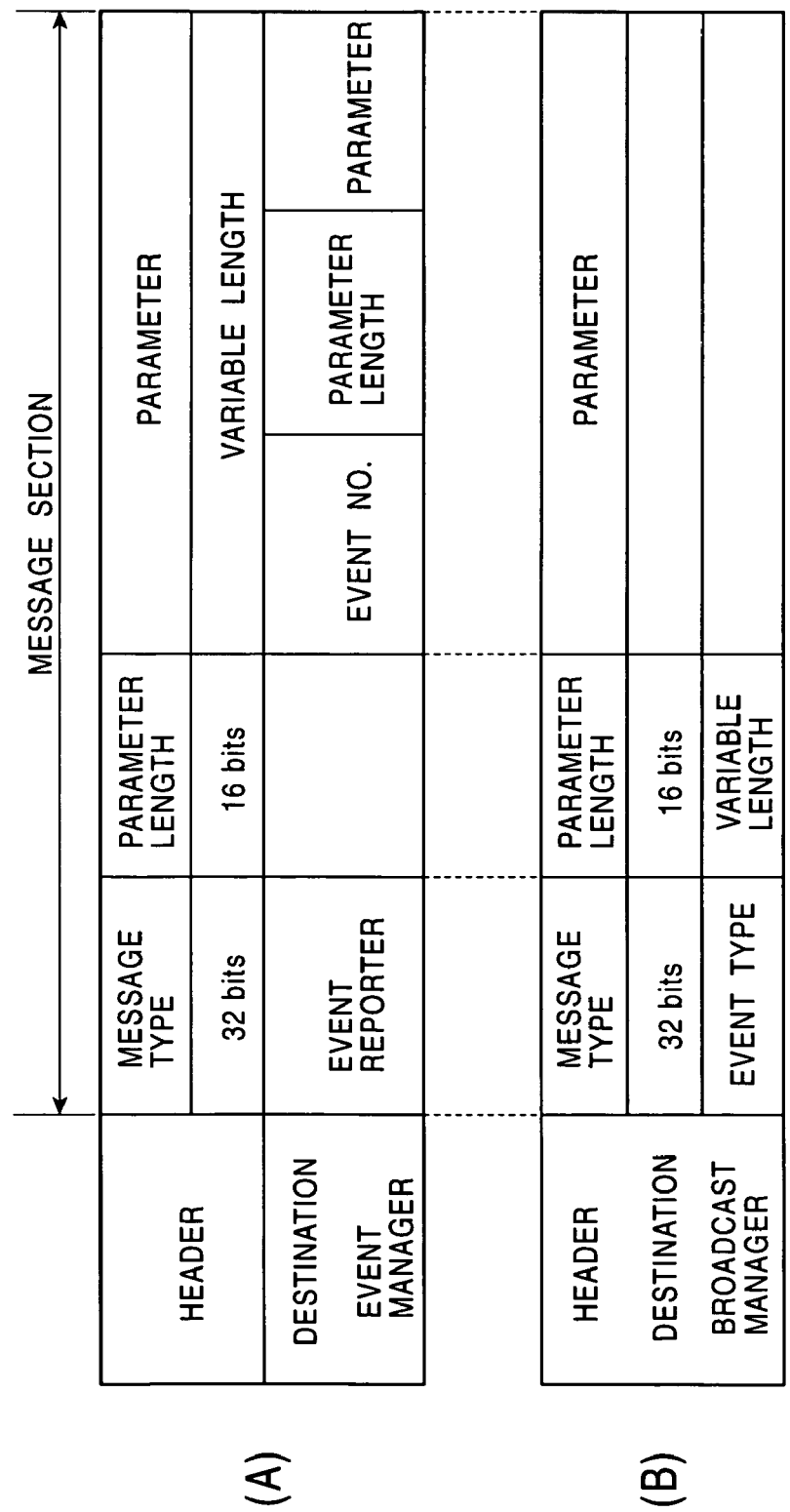
FIGS. 4A and 4B show a message which is reported to a broadcast manager by an event manager of the broadcast client of FIG. 1.
Figure 18:
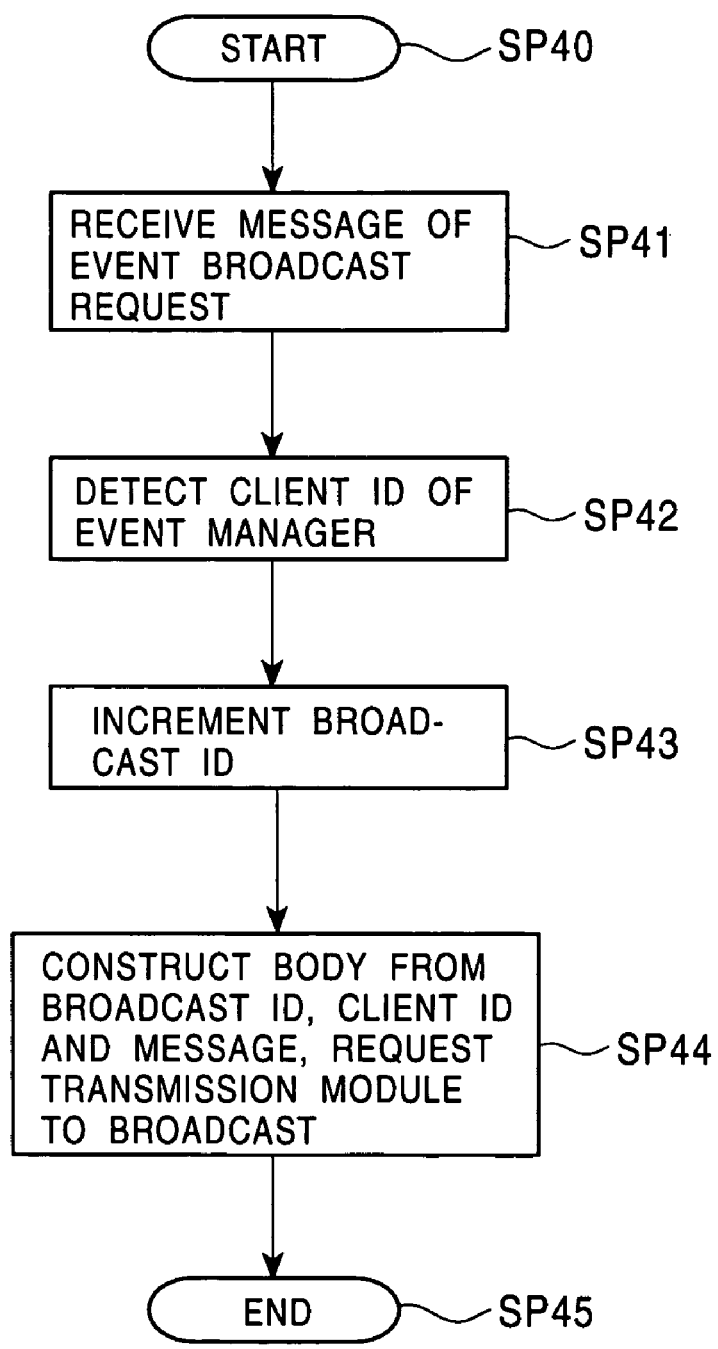
FIG. 18 is a flow diagram showing the processing by broadcast manager 2F, 3F when the event is broadcast.

FIG. 18 is a flow diagram of the process by the broadcast manager 2F, 3F when an event is broadcast. The broadcast manager 2F, 3F goes to step SP41 from step SP40 to receive the message when the message described with reference to FIG. 4 is reported. In succession, the broadcast manager 2F, 3F goes to step SP42 to detect the client ID of the event manager referring to the table describing the client ID already described with reference to FIG. 8.

The broadcast manager 2F, 3F goes to step SP43 to increment the broadcast ID that is most recently broadcast to the network, and then goes to step SP44. The broadcast manager 2F, 3F constructs the body of the client ID detected in step SP42, the broadcast ID produced in step SP43, and the reported message, and thus forms the packet described with reference to FIG. 7. After sending the packet to the transmission module 2G, 3G, the broadcast manager 2F, 3F goes to step SP45 to end the process.

The broadcast manager 2F, 3F updates sequentially the broadcast ID for each network while adding the client ID of the event manager to broadcast the message delivered by the event manager.

Figure 19:
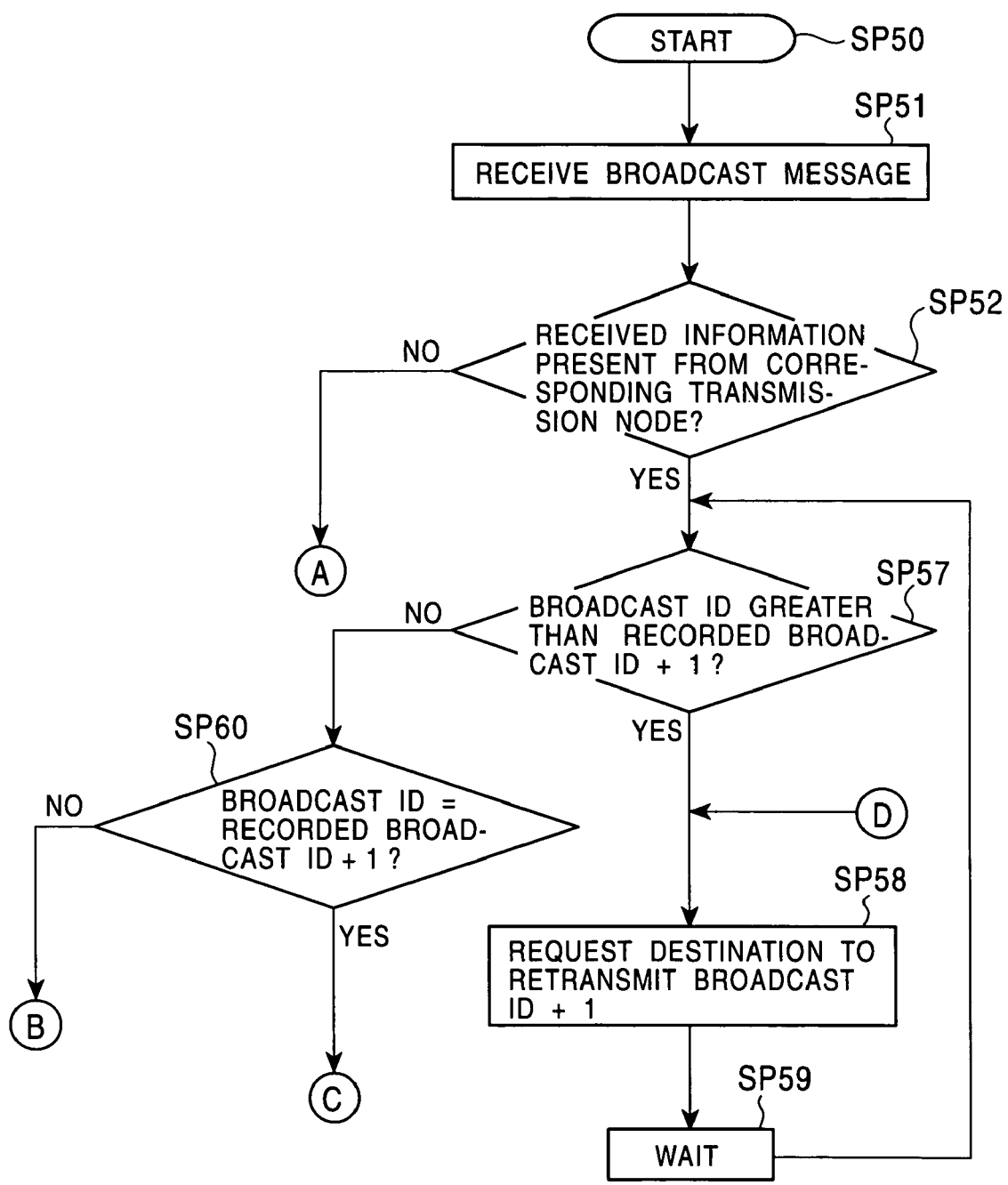
FIG. 19 is a flow diagram showing the processing by the broadcast manager when the message is broadcast to network 4.
Figure 20:
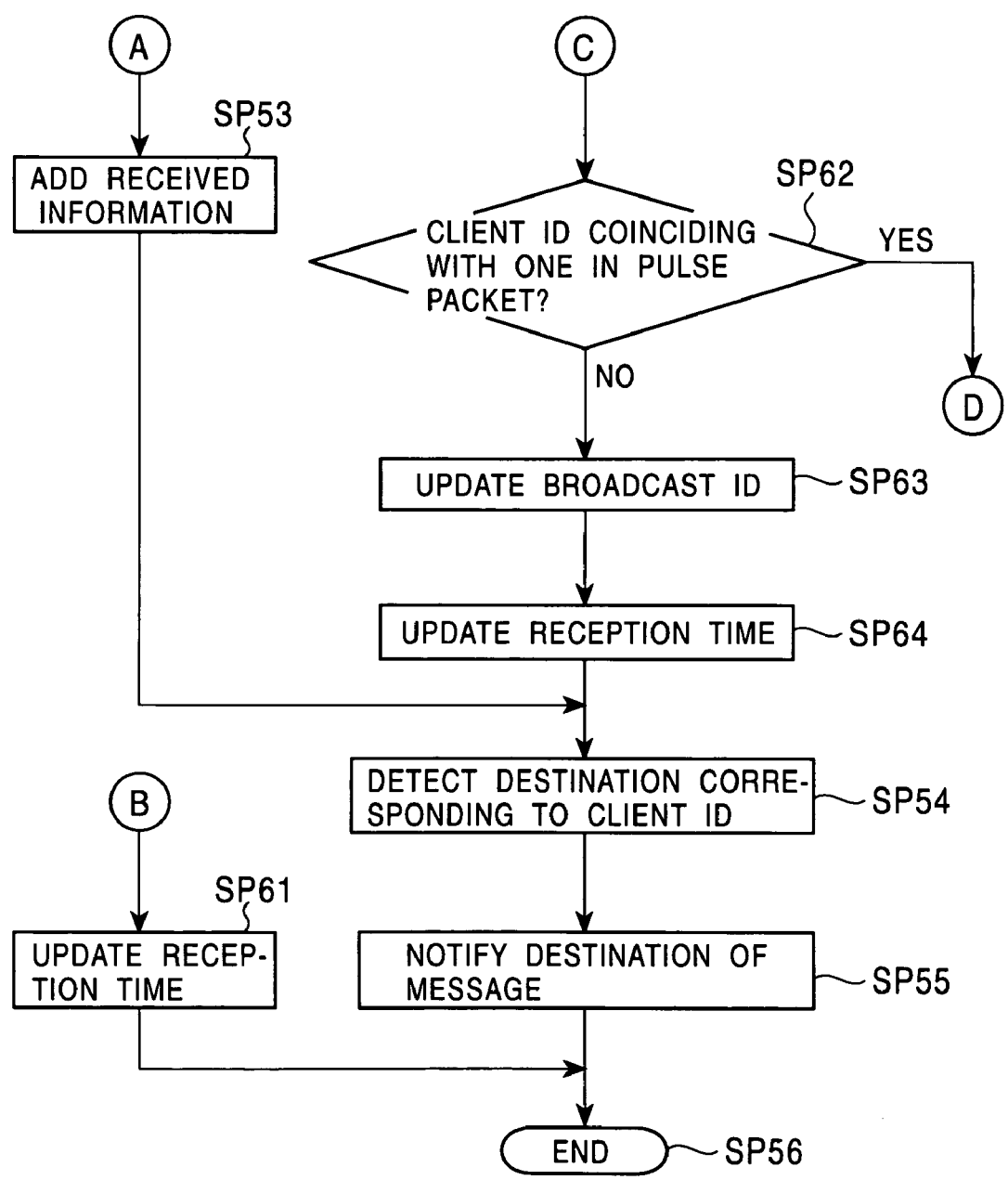
FIG. 20 is a continuation of the flow diagram of FIG. 19.

FIGS. 19 and 20 are flow diagrams of the process by the broadcast manager 2F, 3F when the message broadcast to the network 4 is reported by the transmission module 2G, 3G. The broadcast manager 2F, 3F goes to step SP51 from step SP50 to receive the message. The broadcast manager 2F, 3F goes to step SP52 to detect the sender node from the header of the received message. The broadcast manager 2F, 3F accesses the table having the reception result to determine whether the table contains reception information of the corresponding sender node.

With a negative result, the broadcast manager 2F, 3F goes to step SP53 (FIG. 20) to add reception record of the received message to the table. The broadcast manager 2F, 3F goes to step SP54 to detect the destination of the client ID of the message from the table describing the client ID already described with reference to FIG. 8.

The broadcast manager 2F, 3F goes to step SP55 to send the message to the detected destination, and goes to step SP56 to end the process. When the broadcast manager 2F, 3F receives, for the first time, a message from a device newly installed to the network 4, the broadcast manager 2F, 3F newly adds the reception record of this device to the table while reporting the received message to the event manager or the like.

When the reception record is already held in the table with an affirmative answer resulting from step SP52 (FIG. 19), the broadcast manager 2F, 3F goes to step SP57. The broadcast manager 2F, 3F determines whether the broadcast ID added to the message is greater than the value that is obtained by adding 1 to the broadcast ID in the reception record.

The broadcast manager 2F, 3F determines whether a reception failure is present between the most recently received message from the device and the newly received message. When there is a missing message with an affirmative answer resulting from step SP57, the broadcast manager 2F, 3F goes to step SP58 to request the retransmission of the message (having the broadcast ID equal to the recorded broadcast ID plus 1). The retransmission request is performed in the one-to-one communication with the destination node specified.

The broadcast manager 2F, 3F goes to step SP59 to wait for the retransmission of the message. Upon receiving the message, the broadcast manager 2F, 3F goes to step SP57. In this way, the broadcast manager 2F, 3F detects the failure in the reception of the message that is broadcast without identifying itself, and when the reception failure is detected, the broadcast manager 2F, 3F acquires the message in the one-to-one communication.

When step SP57 results in a negative answer, the broadcast manager 2F, 3F goes to step SP60. The broadcast manager 2F, 3F determines whether the broadcast ID added to the message coincides with the broadcast ID in the reception record plus 1.

When the answer is negative, the same message may be transmitted repeatedly by the same device for some reasons, or a pulse packet may be received. The broadcast manager 2F, 3F goes to step SP61 (FIG. 20) to update the reception time for the reception record, and then goes to step SP56 to end the process.

When the answer is affirmative in step SP60, the broadcast manager 2F, 3F goes to step SP62 (FIG. 20) to determine whether the client ID added to the message according to the table shown in FIG. 8 coincides with the client ID designated by the broadcast manager 2F, 3F, and thus to determine whether the message is based on the pulse packet.

When the answer in step SP62 is affirmative, a reception failure may have taken place between the preceding reception record and this packet, and the broadcast manager 2F, 3F returns to step SP58 to request the retransmission of the message.

When the answer in step SP62 is negative, the broadcast manager 2F, 3F goes to step SP63 to update the corresponding broadcast ID in the reception record. The broadcast manager 2F, 3F goes to step SP64 to update the reception time, and then goes to step SP54. The broadcast manager 2F, 3F therefore updates the past reception record when it receives the message broadcast by the once registered sender, while delivering the received message to the corresponding module.

In the AV system 1 (of FIG. 1) thus constructed, the television receiver 2 and video cassette recorder 3, once connected to the network, physically detect their own connection to the network. Each object issues, to the local messenger 2C, 3C, the message of the event occurrence (FIG. 2) corresponding to the connection, with the event manager constituting the broadcast client 2D, 3D as a destination.

The message is reported to the broadcast client 2D, 3D by the local messenger 2C, 3C, respectively, and is then delivered to the broadcast manager 2F, 3F (FIGS. 4A and 4B). The event manager searches the service list (FIGS. 3(A) and 3(B)) for the corresponding destination. When there is the corresponding destination, the message is delivered to the destination. In the television receiver 2 and video cassette recorder 3, the event is reported to the corresponding module in the one-to-one communication.

A client ID and a broadcast ID are set for the message thus reported to the broadcast manager 2F, 3F according to the list held by the broadcast manager 2F, 3F. The message, the client ID and the broadcast ID are organized into the packet in the predetermined format (FIG. 7) and the packet is reported to the transmission module 2G, 3G. The message in the packet is then broadcast to the network by the transmission module 2G, 3G.

The AV system 1 releases the network 4 for the transfer of the audio data and video data immediately after the message is broadcast. The AV system 1 therefore releases the network 4 for a sufficiently long time for the transfer of the information signal such as the video data and audio data.

The message sent to the network 4 is held along with the transmission time, the broadcast ID, and the client ID in the backlog in the broadcast manager 2F, 3F (FIG. 9), and is thus stored for the predetermined period of time.

The broadcast manager 2F, 3F to which the message is transmitted produces the pulse packet based on the same broadcast ID (FIG. 10), and the pulse packet is periodically transmitted to the network 4 to which the message is transmitted.

In the other devices connected to the network 4, the transmission module 2G, 3G receives the broadcast packet, and the message of the packet is then reported to the broadcast manager 2F, 3F. The broadcast manager 2F, 3F determines, based on the sender ID, whether there is a past reception record from the same device in connection with the message. When there is no past record, the reception time, sender node, broadcast ID and network type of the message are recorded (FIG. 11). The message is sent to the event manager of the broadcast manager 2F, 3F designated by the client ID, and is then delivered to the object in accordance with the service list. The data, required for the one-to-one communication, identifying the device that transmits the message is added to the list held by the network messenger 2E, 3E.

The object that has received the report detects a device newly installed to the network, and sends the corresponding message in compliance with the needs of other objects. The message is transmitted by the local messenger to the network messenger 2E, 3E. The network messenger 2E, 3E then transmits the message in the one-to-one communication with the newly installed device as the destination.

The pulse packet that is transmitted periodically in succession to the message broadcasting is also received by other devices connected to the network 4. The broadcast manager 2F, 3F determines, based on the sender ID, whether, there is a past reception record from the same device in connection with the pulse packet. When there is no past record, the packet is added to the reception record. To detect a past message reception failure, the broadcast manager 2F, 3F determines whether the broadcast ID of the packet coincides with the broadcast ID in the reception record plus 1. The broadcast manager 2F, 3F also determines, based on the client ID, whether the message is a pulse packet.

When a reception failure is detected, another device organizes a packet to request the retransmission of the message based on the sender node and broadcast ID of the pulse packet, and the packet is transmitted to the network 4 in the one-to-one communication with the broadcast manager of the device that has transmitted the message as the destination.

The device that has originally transmitted the message receives the packet of the retransmission request, and the retransmission request message is sent to the broadcast manager 2F, 3F. Based on the sender node and the broadcast ID added to the retransmission request, the message previously broadcast and recorded is organized into a packet, and the packet is transmitted in the one-to-one communication to the broadcast manager of the device that has issued the message of retransmission request. In this way, even if the network is immediately released for another job immediately after the transmission of the message, a variety of messages are reliably broadcast.

Under this condition, when the device that has transmitted the preceding message is required to transmit the message again, its object issues the message of the event occurrence to the event manager. For example, when a user switches from a video signal input to a network input in the television receiver 2, the devices that have the capability to feed signals to the network must be identified, and the event occurrence needs to be broadcast to the network.

In such a case as well, the device in which an event occurs causes the event manager to issue the message in the one-to-one communication. The message of the event is further sent to the broadcast manager 2F, 3F, which broadcasts the message to the network. The message of the event is tagged with the broadcast ID that is the previous broadcast ID plus 1, is then broadcast to the network 4, and is recorded in the backlog.

Like the previous message, this message is received in the other devices connected to the network 4 and sent to the broadcast manager 2F, 3F. The broadcast manager 2F, 3F determines whether there is a past reception record in connection with the message in the same way as the previous pulse packet. The broadcast ID in the message is compared with the one in the past reception record. When the broadcast ID is greater than the broadcast ID in the past reception record by more than 1, there must be a missing message between the reception record and the currently received message. The broadcast manager 2F, 3F produces a packet for a retransmission request, and the packet is transmitted to the network 4.

The reception failure in the message broadcast to the network is detected by the change in the broadcast ID. In response to the detected reception failure, the AV system 1 places a retransmission request. In this way, even if the network is immediately released for another job immediately after the transmission of the message, a variety of messages are reliably broadcast.

The message recorded in the backlog is deleted after a time sufficient enough to detect a reception failure in the receiver side elapses, namely, after a duration at least twice as long as but shorter than several ten times the transmission period of the pulse packet. In this way, unnecessary records are deleted. In the receiver side, the newly received message updates the reception record.

In the television receiver 2 connected to the network 4, a user may monitor the status of the video cassette recorder 3 in the form of text on a display screen. For example, the user may want to present on screen a playback time from the video cassette recorder 3. In such a case, the television receiver 2 requests reporting of the events related to the video cassette recorder 3.

In the television receiver 2, the object sends a message, which is then reported to the network messenger 2E via the local manager by the event manager. The network messenger 2E reports the message to the video cassette recorder 3. The message received by the video cassette recorder 3 is reported to the network messenger 3E and then to the broadcast client 3D.

The event manager in the broadcast client 3D examines the message (FIG. 5A) for message type, and the destination of the event number attached to the message is registered in the destination list of the corresponding service list. Conversely, to cancel registration (FIG. 5B), the observer of the event number is deleted from the destination list.

The event corresponding to the event number may be reported in the one-to-one communication to the object within or outside the device.

In the reporting of the event, the network messenger 2E, 3E handles the one-to-one communication between devices and the local messenger 2C, 3C handles the one-to-one communication within the device. Within the device, the process of broadcasting the message to the network 4 is completed by simply exchanging a message between an object and an event manager in the one-to-one communication. More particularly, each object can exchange a message with unspecified destinations without regard to the difference between communication within the device and communication between devices. After the message is transmitted, the process of a subsequent job is started. The workload involved in the communication of the message is thus reduced. In each device, cooperation between objects within the device and cooperation between devices are assured, permitting a time sufficient enough to transmit information signal.

The broadcast manager for broadcasting the message to the network and the event manager for converting the message into the one in the one-to-one communication are provided in the device. By simply exchanging the message with the event manager, the object in the device can exchange the message with unspecified destinations without regard to the difference between communication within the device and communication between devices. In this way, cooperation between objects within the device and cooperation between devices are assured, reducing the workload imposed on each object. A time sufficient enough to transmit information signal is thus assured.

The exchange of the message with a particular destination is performed by requesting the local messenger. When the destination is outside the device, the local messenger sends the message to the network messenger, and the object can thus exchange the message without regard to the difference between communication within the device and communication between devices. With the local messenger also handling the communication with the event manager, the object can thus report a variety of messages in a simple process.

The message, when broadcast to the network 4, is tagged with the broadcast ID sequentially incremented at each message broadcasting. By storing the message for a predetermined period of time, the reception failure is detected referring to the change of the broadcast ID attached to the message. When the reception failure is detected, the message is retransmitted. Even if the network is released for another job after the broadcasting of the message, the message is reliably transmitted. A time sufficient enough to transmit the information signal is assured resulting in an improved reliability of the system.

The pulse packet is organized by removing the body from the transmitted message and is periodically transmitted. The receiver side can thus detects a reception failure by comparing the broadcast ID attached to the immediately preceding message to the broadcast ID of the pulse packet. Even if the network is released for another job after the broadcasting of the message, the message is reliably transmitted. A time sufficient enough to transmit the information signal is assured resulting in an improved reliability of the system.

In the above embodiment, the broadcast ID as reference information attached to the message is sequentially incremented. The present invention is not limited to this method. The broadcast ID may be sequentially incremented according to a predetermined rule.

In the above embodiment, the broadcast ID of the pulse packet as verification information is assigned the broadcast ID of the message broadcast immediately before it. The present invention is not limited to this method. The receiver side can detect a reception failure if there is a certain relationship between the reference information attached to the message and the verification information. The relationship between the reference information and the verification information is set in various ways as necessary.

In the above embodiment, the event manager and the broadcast manager are organized as separate modules. The present invention is not limited to such an organization. Both managers may be integrated into a unitary module. With this arrangement, the communication between the two modules is dispensed with, and the speed of communication is increased. As for the remaining modules, a plurality of modules may be integrated.

In the above embodiment, the destination of the message is modified depending on the type of event by delivering each event according to the service list. The present invention is not limited to this method. The destination of the message may be modified depending on the site of an event occurrence (in the device, in a particular room, in a particular network, for example) besides the type of event. With this arrangement, the broadcast managers share the service list so that the broadcasting by a particular device no objects are interested in are prevented from being retransmitted, and the quantity of communication is accordingly lowered.

In the above embodiment, the present invention is applied to the television receiver and the video cassette recorder, both constituting the AV system. Beside such an application, the present invention finds applications in video equipment such as satellite broadcast receivers, audio equipment connected to a network and computers.

According to the present invention, the information broadcasting means for broadcasting the message to the network and the event manager responsible for delivering the message in the device are provided. By simply exchanging the message with the event manager, the object can perform message exchange without any discrimination between communication outside the device and communication inside the device or without any discrimination between particular destinations and unspecified destinations. In this way, cooperation between objects within the device and cooperation between devices are assured, permitting a time sufficient enough to transmit information signal.

What is claimed is:

1. An information signal device connected to a network, comprising:
    at least one object for generating messages concerning events occurring in the information signal device, wherein said messages have specified and unspecified destinations;
    an event manager for directing the messages generated by the at least one object to destinations inside and outside the information signal device;
    a network messenger for transmitting generated messages to a specified destination on the network directed by the event manager;
    a broadcast manager for broadcasting generated messages having unspecified destinations to the network as directed by the event manager, wherein the broadcast manager broadcasts each message with reference information attached thereto, the reference information changing at each message broadcast according to a predetermined sequence, wherein the broadcast manager broadcasts, in a predetermined repetition period, verification information having a predetermined relationship with the reference information, and wherein the broadcast manager deletes the held message at a moment a duration longer than twice the predetermined repetition period elapses, and
    wherein the messages generated by the at least one object are delivered by exchanging the messages with the event manager in a one-to-one communication, and wherein the at least one object does not discriminate whether the destinations of the messages are outside or inside the information signal device.

2. An information signal device according to claim 1, wherein the broadcast manager holds the broadcast messages and transmits the held messages in response to a transmission request from the event manager.

3. An information signal device connected to a network, comprising:
    at least one object for generating messages concerning events occurring in the information signal device, wherein said messages have specified and unspecified destinations;

an event manager for directing the messages generated by the at least one object to destinations inside and outside the information signal device;

a network messenger for transmitting generated messages to a specified destination on the network directed by the event manager;

a broadcast manager for broadcasting generated messages having unspecified destinations to the network as directed by the event manager, and wherein the messages generated by the object are delivered by exchanging the messages with the event manager in a one-to-one communication, and wherein the at least one object does not discriminate whether the destinations of the messages are outside or inside the information signal device, wherein the broadcast manager also receives broadcasted messages from the network, recognizes a change in reference information attached to the broadcasted messages received from the network, deletes the held message at a moment a duration longer than twice the predetermined repetition period elapses, wherein the reference information changes at each message broadcasted according to a predetermined sequence, and requests a sender of a broadcasted message to retransmit the broadcasted message in response to a result of the recognition.

4. an information signal device according to claim 3, wherein the broadcast manager receives broadcasted messages from the network, and also receives verification information transmitted to the network, and requests a device, which has transmitted the verification information, to transmit the broadcasted message when there is no predetermined relationship between the received verification information and the reference information attached to the received message.

* * * * *